United States Patent [19]

Lo et al.

[11] Patent Number: 4,698,406

[45] Date of Patent: Oct. 6, 1987

[54] CURABLE ORGANOPOLYSILOXANE COMPOSITION

[75] Inventors: Peter Y. K. Lo; Maris J. Ziemelis, both of Midland, Mich.

[73] Assignee: Dow Corning Corporation, Midland, Mich.

[21] Appl. No.: 926,762

[22] Filed: Nov. 4, 1986

[51] Int. Cl.$^4$ .............................................. C08G 77/06
[52] U.S. Cl. ....................................... 528/12; 528/26; 528/32; 528/38; 528/901; 525/477; 427/387; 427/388.1; 428/447; 428/450
[58] Field of Search ...................... 528/12, 26, 32, 38, 528/901; 525/477

[56] References Cited

U.S. PATENT DOCUMENTS

| | | | |
|---|---|---|---|
| 3,033,815 | 5/1962 | Pike | 260/46.5 |
| 3,975,251 | 8/1976 | McGinniss | 204/181 |
| 4,122,074 | 10/1978 | Pepe et al. | 526/26 |
| 4,198,331 | 4/1980 | Buchwalter et al. | 260/29.2 |
| 4,209,455 | 6/1980 | Pepe | 556/419 |
| 4,370,160 | 1/1983 | Ziemelis | 71/117 |
| 4,429,082 | 1/1984 | Lee et al. | 525/426 |
| 4,603,086 | 7/1986 | Fujii et al. | 528/38 |

*Primary Examiner*—Melvyn I. Marquis
*Attorney, Agent, or Firm*—Alexander Weitz

[57] ABSTRACT

A curable silicone composition comprising (i) an amine-functional organopolysiloxane and (ii) an acryl-functional organopolysiloxane selected from acyloxy-, methacryloxy or acrylamide-functional organopolysiloxanes is disclosed. Components (i) and (ii) of the composition cure by a Michael-type addition reaction to form a solid organopolysiloxane resin or elastomer. In a preferred embodiment, a room-temperature vulcanizable (RTV) elastomer results.

48 Claims, No Drawings

CURABLE ORGANOPOLYSILOXANE COMPOSITION

BACKGROUND OF THE INVENTION

This invention relates to organopolysiloxane curable (vulcanizable) compositions. More particularly, this invention relates to two-part siloxane compositions wherein one siloxane copolymer contains amine functionality which is capable of reacting with the other siloxane copolymer, which contains acryloxy, methacryloxy or acrylamide functionality (hereinafter acryl-functional siloxane). The reaction, which leads to a cured elastomer or resin, takes place via a Michael-type addition between the amine-functional siloxane and the acryl-functional siloxane.

The reaction between amine-functional and alpha-beta olefinically unsaturated compounds is well known in the art and is often referred to as a Michael addition. Pike et al., in U.S. Pat. No. 3,033,815, disclose the preparation of organosilicon compounds containing a substituted amino group attached to at least one silicon atom thereof through an alkylene linkage of at least three carbon atoms. This is accomplished by reacting an aminoalkyl silicon compound with a variety of alpha-beta olefinically unsaturated organic compounds. The reactive aminoalkylene group can be attached to a silane or siloxane structure. The compounds taught by Pike et al. are said to find use as sizes for fibrous materials, modifiers for polydimethylsiloxane oils and gums, adhesives and flocculation agents.

In U.S. Pat. No. 4,122,074 to Pepe et al., polyester aminoalkylalkoxysilanes are provided by effecting the Michael addition reaction of an unsaturated conjugated polyester with an aminoalkylalkoxysilane. These polymers are said to have utility as adhesion promoters between siliceous materials and organic resins and can further act as a size, or protective coating, when the siliceous material is glass cloth or fiber.

In U.S. Pat. No. 4,209,455, Pepe discloses aminoorganosilicon acylamino compounds which are prepared by a Michael addition of an amino-functional alkoxysilane to an olefinic carboxylate ester to form the corresponding aminocarboxylic acid ester of the silane. This amino-carboxylic acid ester-silane is then amidated with either a primary amino silicon compound or a primary organoamine to produce the desired amino-organosilicon acylamino compound. Alkoxy groups on the silicon of these final compounds may be hydrolyzed and condensed, with or without other conventional organosilanes, to form polymeric siloxanes having the respective amine functionality attached thereto. The silanes and siloxane compositions thus produced are said to be useful as sizes for fibrous materials (i.e., as coupling agents and as additives for hydroxyl containing organic thermoplastic polymer compositions.

In U.S. Pat. No. 4,429,082, Lee et al. disclose film-forming resins produced by the Michael addition of an amine-functional silane or amine-functional siloxane to a condensation product which contains at least 2 amine reactive acrylyl residues per molecule. Examples of useful condensation products (backbone polymer) include unsaturated polyester polyol polyacrylate, alkyd-polyol polyacrylate and polyurethanepolyol polyacrylate. The silanes employed in the Michael addition contain alkoxy groups which are retained after the addition and allow the products of this invention to be cured with the aid of organometallic catalysts. The resins so produced are said to be useful film-forming components in coating compositions which can be cured at low temperatures and preferably include a low organic solvent content.

Acryl-functional silicone compounds are disclosed by Lee and Lutz in copending application Ser. No. 816,477, filed Jan. 6, 1986, and assigned to the assignee of this invention. In this case, acryl silane (or silicone) compounds are made by reacting an amine-functional silane (or amine-functional silicone) with a di- or multifunctional acryl compound by a Michael addition reaction. These acryl silane (silicone) compounds are said to be purer than those formed by other routes since no catalyst is used and no by- products are formed. The compounds are further said to have utility as adhesion promoters (silanes) and as coatings compositions which can be cured by ultraviolet radiation (silicones).

The Michael addition reaction has also been employed in the heat cure of electrocoating compositions. McGinniss, in U.S. Pat. No. 3,975,251, teaches coating a cathode substrate with a polymer having pendant amine groups and a cross-linking agent having alpha-beta-ethylenically unsaturated carbonyl groups. The coating process employs an aqueous dispersion of the polymer and cross-linking agent wherein the amine groups are first protonated with an acid to render the polymer dispersable prior to electrodeposition. Upon electrodeposition, the amine groups become deprotonated and then cross-link with the alpha-beta-ethylenically unsaturated carbonyls upon heating to form a fully cured coating on the substrate.

Buchwalter et al., in U.S. Pat. No. 4,198,331, teach a curable resinous composition comprising a polyamine resin containing amino groups, which are stable under the curing conditions, and a Michael adduct of an organic material containing alpha, beta-ethylenically unsaturated moieties in conjugation with carbonyl moieties reacted with amines, which is unstable under curing conditions. When these compositions are heated to curing temperatures, it is believed the adduct decomposes releasing amine which volatilizes, generating alpha, beta-ethylenically unsaturated carbonyls which cure via a Michael addition reaction with non-volatile amines present in the composition.

Two-part silicone (siloxane) room-temperature vulcanizable (RTV) rubber compositions are well known in the art. Both addition-type and condensation-type cure mechanisms are known to convert the generally pourable components into cross linked elastomeric systems, but each of these has its drawbacks. For example, a typical addition cure RTV based on the reaction of a vinyl-functional silicone with an SiH-functional silane (or silicone) requires a platinum catalyst. This cure mechanism is often rendered ineffective when the catalyst is "poisoned" in the presence of certain sulfur or amine compounds. On the other hand, a typical condensation cure RTV based on the reaction of a silanol-functional silicone with an SiH-functional silane (or silicone), also requires a catalyst, such as an organotin compound, and has the further disadvantage of system shrinkage, moisture sensitivity and "gassing" due to evolution of hydrogen in the associated reaction.

These disadvantages have been eliminated by the present invention wherein no catalyst is required for the cure of two-part silicone compositions comprising an amine-functional organopolysiloxane and an acryl-functional organopolysiloxane. Thus, the compositions of this invention offer many of the advantages of an addition-type cure without the problems associated with the incorporation of catalysts.

SUMMARY OF THE INVENTION

It has now been found that certain amine-functional organopolysiloxanes may be combined with acryloxy, methacryloxy or acrylamide functional organopolysiloxanes to form a two-part vulcanizable composition.

This invention therefore relates to a vulcanizable composition comprising:
(i) an amine-functional organopolysiloxane consisting of a plurality of independently selected units of the formula

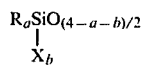

wherein X is an amine-functional organic group bearing at least one —NHR" group, in which R" is hydrogen or an alkyl radical having 1–6 carbon atoms, R is a group selected from alkyl, cycloalkyl, haloalkyl, aromatic or haloaromatic radicals, a has a value of 0, 1, 2, or 3, b has a value of 0, 1 or 2, and the sum (a+b) is less than 4, there being on average at least two X groups per molecule of said amine- functional organopolysiloxane; and
(ii) an acryl-functional organopolysiloxane consisting of a plurality of independently selected units of the formula

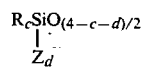

wherein Z is an acryl-functional organic group bearing at least one group selected from acryloxy, methacryloxy or acrylamide radicals, R has been previously defined, c has a value of 0, 1, 2, or 3, d has a value of 0, 1 or 2, and the sum (c+d) is less than 4, there being on average at least two Z groups per molecule of said acryl-functional organopolysiloxane, and at least one of (i) and (ii) has an average of more than two of said X groups and said Z groups, respectively, per molecule.

This invention further relates to a process for preparing a cured organopolysiloxane material, comprising reacting component (i), as defined above, with component (ii), as defined above.

This invention further relates to a cured organopolysiloxane reaction product of components (i) and (ii), as defined above.

DETAILED DESCRIPTION OF THE INVENTION

The organopolysiloxane compositions of the present invention are convertible to the cured solid state by a Michael-type addition reaction, preferably at room temperature. These compositions comprise a liquid, or soluble solid, uniform mixture of two types of organopolysiloxanes: (i) an organopolysiloxane bearing an average of at least two reactive amine radicals per molecule and (ii) an organopolysiloxane bearing an average of at least two reactive acryl radicals per molecule. The term "acryl" as used herein denotes a generic representation of acryloxy, methacryloxy or acrylamide functionalities. Furthermore, at least one of said organopolysiloxanes has an average of more than two, preferably three or more, of said reactive radicals per molecule. Preferably both component (i) and component (ii) have an average of three or more of said reactive amine and reactive acryl radicals, respectively, per molecule.

Organopolysiloxane (i) of the present invention is an amine-functional organopolysiloxane which consists of a plurality of organosiloxane units of the general formula

wherein X is a reactive amine-functional organic group bearing at least one —NHR" group, in which R" is hydrogen or an alkyl radical having 1–6 carbon atoms. On average, at least two reactive X groups per molecule of organopolysiloxane (i) are required to be within the scope of the present invention. In the above formula, R is a non- reactive group which may be independently selected from alkyl radicals having 1–6 carbon atoms, such as methyl, ethyl, propyl, butyl, isopropyl or hexyl radicals. The R group may also be selected from monovalent cycloaliphatic radicals, such as cyclopentyl, cyclohexyl, or cyclooctyl radicals. Alternatively, R can be an aryl group such as phenyl, benzyl, styryl, tolyl and xenyl. Still further, R may be a monovalent halohydrocarbyl group having 1 to 6 carbon atoms such as 3,3,3-trifluoropropyl, 3-chloropropyl or perfluorobutylethyl. Finally, R may be a monovalent haloaromatic group such as 2,4-dichlorophenyl. It is preferred that R is selected from methyl, phenyl or 3,3,3-trifluoropropyl radicals. In any given organosiloxane unit of component (i), the value of a may be 0, 1, 2 or 3, the value of b may be 0, 1 or 2 and the sum (a+b) is less than 4.

The exact nature of the organic portion of the X group is not critical to the operability of this invention, but said organic portion must exclude functionality which would react with the —NHR" groups thereon. Preferably, the organic portion of X should also not react with the acryl-functional groups of component (ii), described infra. In other words, the organic portion of the X groups serves only as a structure to link the amine functionality thereof with the main body of organopolysiloxane (i) and is preferably chemically inert. Thus, for example, the organic portion of Z may be a divalent connecting group such as a hydrocarbon group having at least 3 carbon atoms or an arylene group, such as phenylene.

In a preferred embodiment of this invention, the X group is

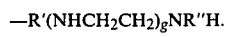

In this embodiment, R' is a divalent hydrocarbon group having from 3 to 6 carbon atoms such as trimethylene, tetramethylene or isobutylene. Preferably, R' is trimethylene or isobutylene. R" is hydrogen or an alkyl radical having from 1 to 6 carbon atoms, preferably hydrogen, and g is an integer having a value from zero to 4. Preferably, g is one.

It is further preferred that the amine-functional organo-polysiloxane (i) be a linear copolymer selected from structures which may be represented by the average formulae

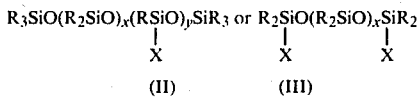

wherein the R groups are independently selected from the nonreactive species enumerated above, the average value of x may vary from zero to about 1000 and the average value of y may vary from 2 to about 100. It is also preferred that the R groups are methyl radicals and X is —R'(NHCH$_2$CH$_2$)$_g$NR"H, as defined above. In these embodiments, particularly preferred X groups are

—CH$_2$CH$_2$CH$_{2H}$NCH$_2$CH$_2$NH$_2$

—CH$_2$CH$_2$CH$_2$NH$_2$

—CH$_2$CH$_2$CH$_2$NH(CH$_3$)

and

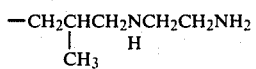

while the most preferred X group is X', which may be represented by the formula

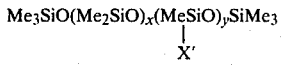 (Group X')

The most preferred amine-functional organopolysiloxanes have the structure

Me$_3$SiO(Me$_2$SiO)$_x$(MeSiO)$_y$SiMe$_3$ (IV)
$\quad\quad\quad\quad\quad\quad\quad\quad\quad\quad |$
$\quad\quad\quad\quad\quad\quad\quad\quad\quad\quad X'$ wherein X' has been defined and Me hereinafter denotes the methyl radical. In this case, x represents the average number of dimethyl units and can range from zero to about 1,000, preferably from 50 to 500. Likewise, y represents the average number of methyl-aminofunctional units and can range from 2 to about 100, preferably from 2 to 30. These amine- functional siloxanes are fluids having a viscosity between about 20 and 4,000 cP at 25° C.

The amine-functional organopolysiloxanes of this invention are well known in the art and some of them are available commercially. There is thus no need for a detailed description as to their preparation herein.

Component (ii) of the present invention is an acryl-functional organopolysiloxane consisting of a plurality of units of the general formula R$_c$SiO$_{(4-c-d)/2}$ (V)
$\quad |$
$\quad Z_d$ wherein Z is a reactive acryl-functional organic group bearing at least one group selected from acryloxy, methacryloxy or acrylamide radicals and R is the nonreactive group defined above. On average, at least two reactive Z groups per molecule of organopolysiloxane (ii) are required to be within the scope of the present invention. In any given organosiloxane unit of component (ii), the value of c may be 0, 1, 2 or 3, the value of d may be 0, 1 or 2 and the sum (c+d) is less than 4.

As in the case of component (i), the exact nature of the organic portion of the Z group is not critical to the operability of this invention, but said organic portion must exclude functionality which would react with the acryl functionality thereon. Preferably, the organic portion of Z should also not react with the amine-functional groups of component (i), described supra. In other words, the organic portion of the Z groups again serves only as a structure to link the acryl functionality thereof with the main body of organopolysiloxane (ii) and is preferably chemically inert. In this regard, the term "inert" defines structures which will not interfere with the reaction between the amine and acryl functionalities of components (i) and (ii), respectively. Thus, for example, the organic portion of Z may be a divalent connecting group such as a hydrocarbon group having at least 3 carbon atoms or an arylene group, such a phenylene.

The acryl-functional siloxanes employed in the present invention are well known in the art and have been synthesized by various procedures. For example, acryl-functional siloxane copolymers suitable for use in the present invention may contain the Z group

—R'''OA wherein R''' is a divalent hydrocarbon radical having 1 to 18 carbon atoms, or the corresponding oxyalkylene radical, and A is the radical CH$_2$=C(B)C=O (Group A)
$\quad\quad\quad\quad |$ in which B is hydrogen or methyl. Such copolymers may be prepared by methods described in U.S. Pat. No. 4,568,566 to Tolentino, hereby incorporated by reference.

Another example of an acryl-functional siloxane copolymer suitable for use in the present invention contains the Z group —R'(NC$_2$H$_4$)$_k$N(CH$_2$CH(CH$_2$)$_m$OA)$_2$
$\quad\quad$H$\quad\quad\quad\quad\quad\quad$|
$\quad\quad\quad\quad\quad\quad\quad\quad\quad\quad$OH wherein R' is a divalent hydrocarbon group, m is an integer between 1 and 10, k is 0, 1, 2, 3, or 4 and A has its previous meaning. Such copolymers may be prepared by methods described in U.S. Pat. No. 4,293,397 to Sato et al., hereby incorporated by reference. Briefly, these copolymers may be prepared by the addition of a glycidyl methacrylate to an amino-terminated diorganopolysiloxane.

Another example of an acryl-functional siloxane copolymer suitable for use in the present invention contains an acrylated urethane silicone having a Z group selected from —DNHG and —DNGDNHG wherein D is a divalent saturated hydrocarbon radical of from 1 to 6 carbon atoms and G is the radical

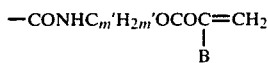

In the above structure, B is selected from hydrogen or the methyl radical while m' can be 2, 3 or 4. The preparation of these acryl-functional siloxanes is described by Gornowicz et al. in U.S. Pat. No. 4,563,539, hereby incorporated by reference.

Yet another example of an acryl-functional siloxane copolymer suitable for use in the present invention contains the Z group taught in U.S. Pat. No. 4,369,300 to Carter et al., hereby incorporated by reference, which discloses the reaction product of a silicone carbinol, a polyisocyanate and a hydroxyacrylate.

Further examples of acryl-functional siloxane copolymers suitable for use in the present invention may be made by reacting an amine-functional silicone with a di- or multi- functional acryl-functional compound by a Michael-type addition reaction. These acrylo-functional silicone compounds, and their preparation, are described in a copending application to Lee and Lutz, entitled "Acryl Functional Silicone Compounds," Ser. No. 816,477, filed Jan. 6, 1986, and assigned to the assignee of this application.

Acrylamide-functional organopolysiloxanes suitable for use in the present invention contain groups having the structure

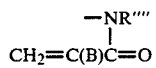

wherein B is either hydrogen or methyl and R"" represents hydrogen or a monovalent hydrocarbon radical. Examples of such acrylamide-functional organopolysiloxanes may be found in U.S. Pat. No. 4,608,270 to Varaprath, hereby incorporated by reference. In this case, the Z group has the structure

—QNAQ'NAR""

wherein Q and Q' denote divalent hydrocarbon radicals. and A has been defined as

 (Group A)

Briefly, such siloxanes can be prepared by mixing an acyl halide with an aminosilicon compound having at least one silicon-bonded amino-substituted hydrocarbon radical containing at least one nitrogen-bonded hydrogen. The mixing step is carried out in the presence of an aqueous solution of an alkaline material and a water-insoluble solvent for said aminosilicon compound.

These and other acryl-functional organopolysiloxanes known in the art may be employed as component (ii) of this invention provided they comply with the above mentioned restrictions on reactivity.

Preferred acryl-functional organopolysiloxanes of this invention are selected from linear copolymers having an average structure which may be represented by the formulae

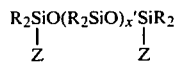 (VI)

or

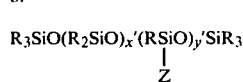 (VII)

wherein R is independently selected from the non-reactive radicals defined above, the average value of x' may vary from about 5 to about 500 and the average value of y' may vary from 2 to about 30. In formula (VI) the acryl-functional groups are terminal to the siloxane chain and in formula (VII) they are pendant to the chain.

For the purposes of the present invention, a preferred Z group is Z', which is represented by the formula

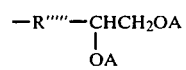 (Group Z')

wherein R""" is a divalent hydrocarbon group having from 3 to 6 carbon atoms. Preferably, R""" is trimethylene. In the above formula for Z', A has been previously defined.

Siloxanes bearing the group Z' may be prepared according to the following synthesis steps. The synthesis is illustrated for the case of siloxanes having terminal acryl- functional groups and R""" being trimethylene, but the procedure applies equally to siloxanes having different R""" groups and pendant reactive groups.

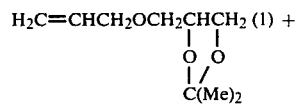

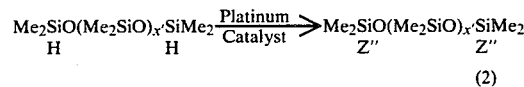

wherein Z" denotes

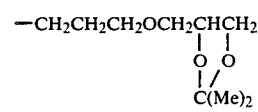 (Group Z")

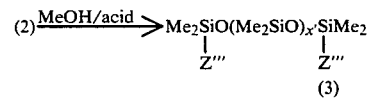

wherein Z''' denotes

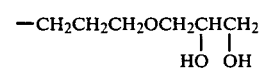 (Group Z''')

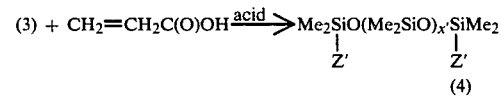

This preparation has been described in detail in a copending application by P. Lo, entitled "Dioxolane, Diol and Diacrylate Silicon Compounds and Method for Their Preparation and Use," Ser. No. 914,899, filed on Oct. 3, 1986 and assigned to the assignee of this application.

Furthermore, the siloxane represented by formula (3), above, is known in the art and may alternatively be prepared by a method disclosed by Okazaki et al. in U.S. Pat. No. 4,431,789.

The most preferred acryloxy-functional organopolysiloxanes of this invention are selected from the structures $$\text{Me}_3\text{SiO}(\text{Me}_2\text{SiO})_{x'}(\text{MeSiO})_{y'}\text{SiMe}_3 \quad \text{(VIII)}$$
$$\qquad\qquad\qquad\quad |$$
$$\qquad\qquad\qquad\quad Z'$$

or $$\text{Me}_2\text{SiO}(\text{Me}_2\text{SiO})_{x'}\text{SiMe}_2 \quad \text{(IX)}$$
$$\;\;|\qquad\qquad\qquad\qquad\quad|$$
$$\;\;Z'\qquad\qquad\qquad\qquad\;Z'$$

wherein Z' has been defined, x' has an average value of about 5 to about 500 and y' has an average value of 2 to about 30. In this case the acryl-functional organopolysiloxane (ii) is a fluid having a viscosity between about 10 and 4000 cP at 25° C.

Similarly, the most preferred acrylamide-functional organopolysiloxanes of this invention have the structure $$\text{Me}_3\text{SiO}(\text{Me}_2\text{SiO})_{x'}(\text{MeSiO})_{y'}\text{SiMe}_3 \quad \text{(X)}$$
$$\qquad\qquad\qquad\quad|$$
$$\qquad\quad\text{CH}_2\text{CH}(\text{CH}_3)\text{CH}_2\text{NCH}_2\text{CH}_2\text{NH}$$
$$\qquad\qquad\qquad\qquad\quad|\qquad\qquad|$$
$$\qquad\qquad\qquad\qquad\;A\qquad\qquad A$$

in which A is the radical $$\text{CH}_2\text{=C(B)C=O}$$
$$\qquad\quad|$$

and B is hydrogen or methyl. Here again, x' has an average value of about 5 to about 500 and y' has an average value of 2 to about 30. This acrylamide-functional organopolysiloxane may be prepared according to methods described by Varaprath, cited supra.

The non-reactive units (i.e., those which do not contain reactive groups X or Z) of organopolysiloxanes (i) and (ii) may be composed of any combination of siloxane units of the formulae $R_3SiO_{\frac{1}{2}}$, $R_2SiO_{2/2}$, $RSiO_{3/2}$, and $SiO_{4/2}$, bonded together by Si-O-Si bonds. Examples of suitable non-reactive siloxane units for either component (i) or (ii) are endblocking triorganosiloxane units, such as $Me_3SiO_{\frac{1}{2}}$, $PhMe_2SiO_{\frac{1}{2}}$, $CF_3CH_2CF_2CF_2CH_2CH_2Me_2SiO_{\frac{1}{2}}$, $CF_3CH_2CH_2Me_2SiO_{\frac{1}{2}}$ and $Ph_2MeSiO_{\frac{1}{2}}$; backbone diorganosiloxane units, such as $Me_2SiO_{2/2}$, $PhMeSiO_{2/2}$, $CF_3CH_2CH_2MeSiO_{2/2}$, $Ph_2SiO_{2/2}$, $ClCH_2CH_2CH_2MeSiO_{2/2}$ and $CF_3CF_2CF_2CF_2CH_2CH_2MeSiO_{2/2}$; and branching monoorganosiloxane units, such as $MeSiO_{3/2}$, $PhSiO_{3/2}$ and $SiO_{4/2}$. Herein, Me denotes the methyl radical and Ph denotes the phenyl radical.

In addition to the groups delineated above, components (i) and (ii) may contain small amounts of non-essential radicals such as silicon-bonded hydroxy, methoxy, ethoxy and acetoxy radicals. These radicals are usually bonded to endblocking siloxane units by design or are present on siloxane units as a residual radical arising from the particular process that was used to prepare the component. Preferably red, components (i) and (ii) are free of such non- essential radicals.

As will be apparent to those skilled in the art, at least one of the components, (i) or (ii), must have an average reactive functionality greater than two in order to effect a cure in the compositions of this invention. Thus, for example, if component (i) has, on average, only 2 reactive amine groups (i.e., active hydrogen on nitrogen, =NH) per molecule, component (ii) must have an average acryl content of greater than 2 groups per molecule. Furthermore, it is preferred that the molar ratio of the active hydrogen of the amine groups of said amine-functional organopolysiloxane to the acryl (i.e., acryloxy, methacryloxy or acrylamide) groups of said acryl-functional organopolysiloxane be close to stoichiometric proportion. This ratio should thus range from about 0.9 to 1.1. Preferably, this ratio should be about 0.95 to 1.05, most preferably, about 1.0.

To be within the scope of this invention, no organopolysiloxane molecule bears both reactive amine- functional radicals and reactive acryl-functional radicals. Preferably, no siloxane unit of the organopolysiloxanes (i) and (ii) bears more than one of said reactive groups X and Z, respectively. Furthermore, for either component (i) or component (ii), any combination of reactive and non-reactive organosiloxane units, which is within the above-mentioned constraints, may be used, provided that the mixture of these components to form the convertible organopolysiloxane composition can result in a liquid at room temperature. Preferably, both component (i) and component (ii) are liquids at room temperature, but the above provisions allow the case wherein one (or both) of components (i) and (ii) is a soluble solid at room temperature. Such is the case when a sufficient number of silicate units ($SiO_{4/2}$) and/or silsesquioxane units ($—SiO_{3/2}$) are included in either or both of components (i) and (ii). When the organopolysiloxanes (i) and/or (ii) contain such structures, yet can be dissolved in an inert solvent to produce the curable compositions, they are within the scope of this invention. Thus, for example, component (i) may be dissolved in an inert solvent and component (ii) then blended with this mixture. The order of such mixing is not critical to the operability of this invention. After mixing, the solvent, if included, may be evaporated either before or during the cure step. Alternatively, when the inert solvent is relatively non-volatile, it may be retained in the cured product, wherein it acts as a plasticizer. By "inert" it is meant that the solvent is non-reactive with respect to said amine or said acryl groups. Solubility is promoted when total molecular weight of either component is reduced and when the content of silicate and silsesquioxane structures is kept relatively low. The exact ranges of solubility can be determined by routine experimentation by those skilled in the art. Particularly useful solvents for this purpose are the linear or cyclic polydimethylsiloxanes having viscosities of about 1 to 100 cP at 25° C. Other solvents which may be employed include toluene, xylene, methylene chloride and mineral spirits.

When components (i) and (ii) are free of $—SiO_{3/2}$ and $SiO_{4/2}$ siloxane units, and the total of all the reactive radicals in (i) and (ii) does not exceed about 10 percent of all the radicals therein, the compositions of this invention generally form elastomeric systems when cured. Such is the case when the preferred amine-functional organopolysiloxanes are combined with the preferred acryl-functional organopolysiloxanes of this invention. These preferred embodiments may be cured at room temperature and are referred to as room temperature vulcanizing or room temperature vulcanizable (RTV) elastomers. In order to achieve this result, component (i) is selected from the siloxanes represented by formula (II) or formula (III) and component (ii) is selected from the siloxanes represented by either formula (VI) or formula (VII), above. In the most preferred compositions, R is methyl, X is X' and Z is Z', as defined above.

In such a preferred elastomer-forming system, the relative contents of the respective amine and acryl groups may be varied according to well-established practice in the art in order to achieve desired final properties in the cross-linked elastomer. For example, if a high modulus elastomer is desired, the number of reactive groups per molecule of the respective components is increased, while if low modulus material is the object, the number of such reactive sites is reduced. In this regard, it will be evident to those skilled in the art that it is sometimes beneficial to formulate a mixture wherein one of the components (i) or (ii) has more than two reactive groups per molecule while the other component is incorporated as a blend of polymers comprised of molecules having just two reactive groups as well as molecules having more than two reactive groups, the desired stoichiometric ratio of amine groups to acryl groups being preserved. In such a case the component having just two reactive groups per molecule is said to be a "chain extender" and acts to further reduce the modulus of the resulting cured elastomer.

In addition to the components (i) and (ii), the compositions of the present invention may contain fillers, inhibitors, solvents, pigments, dyes, stabilizers, extenders, plasticizers, blowing agents, lubricants, antioxidants, adhesion promoters, fragrances and fungicides, as well as other adjuvants commonly employed in the art.

Examples of fillers suitable for inclusion in the compositions of this invention are calcium carbonate, zinc oxide, glass fiber, titanium dioxide, carbon black and polymeric organic materials. Reinforcing fillers, such as fumed silica, triorganosiloxy-treated fumed silica and precipitated silica, are particularly desirable adjuvants. These fillers promote mechanical strength when the compositions containing them are cured according to the methods described infra. Such fillers are preferably included when components (i) and (ii) are the preferred compounds described above which lead to elastomeric products in the cured state, as is well known in the art.

Examples of inhibitors suitable for use in the present invention are volatile acids, such as acetic acid or carbon dioxide. When added in small quantities, these acids delay the Michael addition reaction to provide a longer working life to the compositions of this invention. Preferably, the volatile acid, if incorporated, is added to component (i) and this mixture is then blended with component (ii) to form the inhibited composition. It is also preferred that the volatile acid, when employed, is added at approximately an equimolar content to the =NH groups of component (i). Thus, when such a volatile acid is added to the compositions of this invention, components (i) and (ii) can be mixed together without reacting till said acid is allowed to volatilize from the mixture. This technique can provide a one-component RTV having a limited, but useful, shelf life.

This invention also provides a process for preparing a cured organopolysiloxane material which comprises reacting the abovedescribed amine-functional organopolysiloxane (i) with the above-described acryl-functional organopolysiloxane (ii). According to this process, the components (i) and (ii) are combined to form the vulcanizable compositions of this invention and are subsequently cured to the solid state. As noted above, the respective quantities of the components is selected such that the molar ratio of the active hydrogen on the amine groups (i.e., =NH) of organopolysiloxane (i) to the acryl groups (i.e., acryloxy, methacryloxy or acrylamide) of organopolysiloxane (ii) is substantially near the stoichiometric value. Preferably, this ratio is in the range 0.9 to 1.1, most preferably, 1.0.

This method may be practiced by simply mixing the two components by any suitable means, such as with a spatula or using a mechanical mixer, to obtain a uniform blend therebetween. If a filler, solvent or other adjuvant, is to be part of the composition, this material is generally first thoroughly mixed with one or both of the components (i) and (ii) and the two resulting mixtures are then mixed with one another. The methods used to disperse such materials are well known in the art and need not be further detailed herein. After mixing, the compositions of this invention are cured to the solid state (i.e., non-flowable) either at room temperature or at an elevated temperature of about 50° to 150° C., preferably at room temperature.

This invention further provides a cured organopolysiloxane resin or elastomer which is the reaction product of the above-described amine-functional organopolysiloxane (i) with the above-described acryl-functional organopolysiloxane (ii). The cured organopolysiloxane is formed according to the above process.

The compositions of the present invention may be utilized in a variety of applications. They may be coated onto substrates, either from solution or, if the mixture comprising components (i) and (ii) is liquid, as a solventless system and subsequently cured. The typical coating methods known in the art, such as dip coating, knife coating, flow coating and spraying may be employed. Typical substrates upon which these coatings may be applied include, but are not limited to, metals, such as steel, aluminum, copper and brass, wood, paper, cloth, natural and synthetic fabrics, glass and plastics.

The compositions may be formulated as two-part molding compounds and used in encapsulation of electronic and other components and subsequently cured. This generally entails the inclusion of various non-hygroscopic fillers and various lubricants and is a particularly suitable application for the resin-forming compositions of this invention.

When the compositions are selected from the preferred components (i) and (ii), they find utility as RTV sealants, caulks, encapsulants and adhesives which may be cured to form the respective elastomeric solids. They are also useful in preparing casting molds and replicas. All such systems generally include reinforcing and extending fillers as well as other adjuvants known in the art.

The compositions of the present invention find particular utility in the formation of silicone microparticles and microcapsules. This utility is described in detail in a copending application by the instant inventors entitled "Process for Preparing Silicone Microparticles Cured by a Michael Addition Reaction," Ser. No. 926,763, filed Nov. 4, 1986.

EXAMPLES

The following examples are presented to further illustrate the compositions of this invention, but are not to be construed as limiting the invention, which is delineated in the appended claims. All parts and percentages in the examples are on a weight basis unless indicated to the contrary.

EXAMPLE 1

Into a 2-liter flask, equipped with magnetic stirrer, water trap and condenser, was charged 195 grams of 3-allyloxy-1,-2-propanediol, 225 grams of acetone and 480 grams of toluene. Four grams of concentrated sulfuric acid was then added to this mixture. This combination was stirred and heated to reflux, whereupon the water which formed was trapped over a 13 hour period. The reaction mixture was cooled to room temperature and neutralized with 50 grams of $NaHCO_3$. Distillation of the organic layer yielded 161 grams of a product having the formula

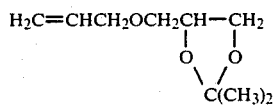

which product had a boiling point range of 57°–58° C. at 4.5 mm Hg.

EXAMPLE 2

Twenty grams of the product of Example 1 was mixed with 80 grams of an SiH-terminated siloxane having, on average, the formula $H(Me_2)SiO(Me_2SiO)_{14}Si(Me_2)H$ wherein Me represents the methyl group. To this mixture was added 0.006 grams of a platinum catalyst which contained 4% platinum and was prepared according to the method described in Example 1 of U.S. Pat. No. 3,419,593 to Willing. The mixture was stirred and reaction was evidenced by a mild exotherm whereupon the temperature rose to about 70° C. Reaction was completed by heating at 70° C. for an additional 5 hours, at which point the infrared absorption due to SiH (2170 $cm^{-1}$) had disappeared. The product had the average structure $Z''(Me_2)SiO(Me_2SiO)_{14}Si(Me_2)Z''$ wherein Z'' is the group

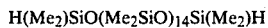

EXAMPLE 3

To a mixture of 30 grams of methyl alcohol and 3 grams of concentrated hydrochloric acid there was added 98 grams of the product of Example 2. This combination was heated up to a temperature of 74° C. to remove volatiles and further stripped at 80° C./30 mm Hg for about 30 minutes. The product was cooled to room temperature and filtered to yield 83.5 grams of a viscous fluid having the average structure $Z'''(Me_2)SiO(Me_2SiO)_{14}Si(Me_2)Z'''$ wherein Z''' is

The theoretical hydroxyl content of 4% was confirmed as 4.0% ±/0.2%.

EXAMPLE 4

Into a 50-ml flask, equipped with a water trap and condenser, was charged with 12.6 grams of the fluid of Example 3, 0.006 gram of hydroquinone, 0.03 gram of concentrated sulfuric acid, 18 grams of toluene and 2.5 grams of acrylic acid. This mixture was heated to reflux and all the water which formed was trapped. At this point, the reaction mixture was stripped at 50° C. and 30 mm Hg to remove volaties. The stripped fluid was an acrylate-functional polydimethylsiloxane having the average structure $Z'(Me_2)SiO(Me_2SiO)_{14}Si(Me_2)Z'$ wherein Z' is the group

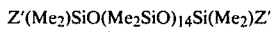

in which A is

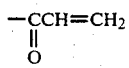

EXAMPLE 5

In an alternate preparation of the acrylate-functional polydimethylsiloxane of Example 4, 83.7 grams of a fluid prepared according to the method of Example 3, above, was mixed with 17.3 grams of acryloyl chloride and 0.02 gram of hydroguinone. This mixture was heated 135° C. for 30 minutes, cooled to 40° C. and neutralized with 3 grams of solid calcium carbonate for an additional 30 minutes. The product was filtered and stripped at 35°–40° C. /10 mm Hg for 30 minutes to yield 91.7 grams of the material having the average structure shown in Example 4.

EXAMPLE 6

Into a 100 ml flask equipped with a stirrer, thermometer and stopper, was charged 18.7 grams of an acrylate-functional polydimethylsiloxane prepared according to Example 5 and 59.9 grams of a blend of cyclic dimethylsiloxanes having about three to six siloxane units. To this mixture was added about 0.2 gram of trifuoromethane sulfonic acid. The reactants were stirred and heated at 70° C. for 3 hours. The resulting fluid was neutralized with solid $CaCO_3$ (2 grams) and filtered. The filtrate was stripped at 100° C./5 mm Hg and had the average structure $Z'(Me_2)SiO(Me_2SiO)_{98}Si(Me_2)Z'$ wherein Z' is the group

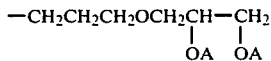

in which A is

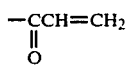

EXAMPLE 7

One gram of the product of Example 6 was thoroughly mixed with 1 gram of an amine-functional siloxane fluid having the average structure

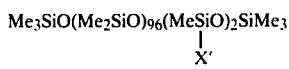

wherein X' is the group

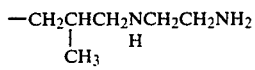

The mixture was poured onto a 1 in.×5 in. aluminum panel and, within 3 hours at room temperature, formed a tack-free, transparent elastomeric film. After curing overnight, the film was readily peeled from the panel. Heating the film at 150° C. for 4 hours resulted in a weight loss of 3.5%.

EXAMPLE 8

One gram of the fluid of Example 4 was thoroughly mixed with 2 grams of an amine-functional siloxane fluid having the average structure $$Me_3SiO(Me_2SiO)_{188}(MeSiO)_{10}SiMe_3$$
$$|$$
$$X'$$

wherein X' has the same meaning as in Example 7, above. This mixture was poured onto an aluminum panel as described in Example 7 and formed a tack-free film within about 1.5 hours. Within 6 hours at room temperature the cured film had sufficient strength to be lifted from the panel.

EXAMPLE 9

An acrylamide-functional siloxane fluid having the average structure

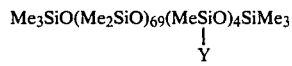

wherein Y is the group

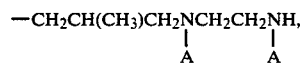

in which A is the radical

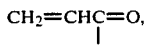

was prepared according to the method of Example 6 of U.S. Pat. No. 4,608,270 to Varaprath. This fluid (0.52 gram) was mixed with 3.16 grams of the amino-functional siloxane used in Example 8, above, to form a uniform composition. The composition was poured onto a glass slide and allowed to cure overnight at room temperature. The result was a tack-free, transparent film which was strong enough to be lifted from the glass slide.

EXAMPLE 10

Two grams of the amine-functional fluid used in Example 8, above, was mixed with 1 gram of the acrylate-functional fluid prepared in Example 4, above. This mixture was poured into an aluminum weighing dish and allowed to cure at room temperature overnight. A circular sample, measuring 4.6 cm in diameter×0.2 cm in thickness, was cut from the product and dynamic mechanical properties determined using a Rheometrics (R) rheometer. At a frequency of 2 radians/second, the storage modulus was $1.9 \times 10^6$ dynes/sq. cm, loss modulus was $8.6 \times 10^4$ dyne/sq.cm and the loss tangent was $4.4 \times 10^{-2}$.

EXAMPLE 11

An identical composition to that of Example 8, above, was prepared using the same amounts of components (i) and (ii). This composition was poured onto a microscope slide and allowed to cure at room temperature. The observed tack-free time was 1.5 hours.

The above experiment was repeated with like quantities of components (i) and (ii) but 0.03 grams of glacial acetic acid was first added to the amine-functional fluid (i.e., before mixing with the acryloxy-functional fluid). This combination was also allowed to cure at room temperature and the tack-free time was now 3.5 hours.

The above experiment was repeated, this time using 0.15 grams of glacial acetic acid. This represents an equimolar ratio of acetic acid to =NH. The tack-free time was now 36 hours.

These experiments illustrate the inhibition of the Michael addition cure by inclusion of a volatile acid in the compositions of this invention.

We claim:
1. A curable composition comprising:
   (i) an amine-functional organopolysiloxane consisting of a plurality of independently selected units of the formula

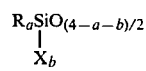

wherein X is an amine-functional organic group bearing at least one —NHR" group, in which R" is hydrogen or an alkyl radical having 1-6 carbon atoms, R is a group selected from alkyl, cycloalkyl, haloalkyl, aromatic or haloaromatic radicals, a has a value of 0, 1, 2, or 3, b has a value of 0, 1 or 2, and the sum (a+b) is less than 4, there being on average at least two X groups per molecule of said amine-functional organopolysiloxane; and (ii) an acryl-functional organopolysiloxane consisting of a plurality of independently selected units of the formula $$R_cSiO_{(4-c-d)/2}$$
$$|$$
$$Z_d$$

wherein Z is an acryl-functional organic group bearing at least one group selected from acryloxy, methacryloxy or acrylamide radicals, R has been previously defined, c has a value of 0, 1, 2, or 3, d has a value of 0, 1 or 2, and the sum (c+d) is less than 4, there being on average at least two Z groups per molecule of said acryl-functional organo-polysiloxane, and at least one of (i) and (ii) has an average of more than two of said X groups and said Z groups, respectively, per molecule.

2. The composition of claim 1, wherein said R groups of components (i) and (ii) are independently selected from methyl, phenyl or 3,3,3-trifluoropropyl radicals.

3. The composition of claim 2, wherein said X group is represented by the formula $$-R'(NHCH_2CH_2)_gNR''H$$

in which R' is a divalent hydrocarbyl group having 3 to 6 carbon atoms, R" is selected from hydrogen or an alkyl radical having 1 to 6 carbon atoms and g is an integer having a value of zero to 4.

4. The composition of claim 3, wherein said Z group is represented by the formula $$-R'''OA \text{ in which } R'''$$

is a divalent hydrocarbon radical having 1 to 18 carbon atoms, or the corresponding oxyalkylene radical, and A is the radical $$CH_2=C(B)C=O$$
$$|$$

in which B is selected from hydrogen or the methyl radical.

5. The composition of claim 3, wherein said Z group is represented by the formula $$-R'(NC_2H_4)_kN(CH_2CH(CH_2)_mOA)_2$$
$$\phantom{-R'(NC_2H_4)_k}H \phantom{N(CH_2CH(}|$$
$$\phantom{-R'(NC_2H_4)_kHN(CH_2CH(CH_2)_m}OH$$

in which R' is a divalent hydrocarbon group, m is an integer between 1 and 10, k is 0, 1, 2, 3, or 4, A is the group $$CH_2=C(B)C=O$$
$$|$$

and B is selected from hydrogen or the methyl radical.

6. The composition of claim 3, wherein said Z group is selected from groups represented by the formulae $$-DNHG \text{ or } -DNGDNHG$$

in which D is a divalent saturated hydrocarbon radical having from 1 to 6 carbon atoms and G is the group $$-CONHC_{m'}H_{2m'}OCOC=CH_2$$
$$|$$
$$B$$

where B is selected from hydrogen or the methyl radical and m' is 2, 3 or 4.

7. The composition of claim 3, wherein said Z group is represented by the formula $$-QNAQ'NAR''''$$

in which Q and Q' denote divalent hydrocarbon radicals, R'''' is hydrogen or a monovalent hydrocarbon radical, A is the group $$CH_2=C(B)C=O$$
$$|$$

and B is selected from hydrogen or the methyl radical.

8. The composition of claim 3, wherein said Z group is represented by the formula $$R''''' OCH_2CHCH_2OA$$
$$|$$
$$OA$$

in which R''''' is a divalent hydrocarbon group having 3 to 6 carbon atoms, A is the group $$CH_2=C(B)C=O$$
$$|$$

and B is selected from hydrogen or the methyl radical.

9. The composition of claim 8, wherein said R''''' group is trimethylene.

10. The composition of claim 7, wherein said Q group is $-CH_2CH(CH_3)CH_2-$, said Q' group is $-CH_2CH_2-$ and said R'''' group is hydrogen.

11. The composition as delineated in claim 1, wherein said organopolysiloxane (i) is selected from linear copolymers having the average structure $$R_3SiO(R_2SiO)_x(RSiO)_ySiR_3 \text{ or } R_2SiO(R_2SiO)_xSiR_2$$
$$\phantom{R_3SiO(R_2SiO)_x(}|\phantom{RSiO)_ySiR_3 \text{ or } R_2SiO(R_2SiO)_x}|\phantom{SiR_2}|$$
$$\phantom{R_3SiO(R_2SiO)_x(}X\phantom{RSiO)_ySiR_3 \text{ or } R_2SiO(R_2SiO)_x}X\phantom{SiR_}X$$

in which the average value of x can vary from zero to about 1000 and the average value of y can vary from 2 to about 100; and said organopolysiloxane (ii) is selected from linear copolymers having the average structure $$R_3SiO(R_2SiO)_{x'}(RSiO)_{y'}SiR_3 \text{ or } R_2SiO(R_2SiO)_{x'}SiR_2$$
$$\phantom{R_3SiO(R_2SiO)_{x'}(}|\phantom{RSiO)_{y'}SiR_3 \text{ or } R_2SiO(R_2SiO)_{x'}}|\phantom{SiR_2}|$$
$$\phantom{R_3SiO(R_2SiO)_{x'}(}Z\phantom{RSiO)_{y'}SiR_3 \text{ or } R_2SiO(R_2SiO)_{x'}}Z\phantom{SiR_}Z$$

in which the average value of x' can vary from about 5 to about 500 and the average value of y' can vary from 2 to about 30.

12. The composition of claim 11, wherein said R groups of components (i) and (ii) are independently selected from methyl, phenyl or 3,3,3-trifluoropropyl radicals.

13. The composition of claim 12, wherein said X group is represented by the formula $$-R'(NHCH_2CH_2)_gNR''H$$

in which R' is a divalent hydrocarbyl group having 3 to 6 carbon atoms, R" is selected from hydrogen or an alkyl radical having 1 to 6 carbon atoms and g is an integer having a value of zero to 4.

14. The composition of claim 13, wherein said Z group is represented by the formula

—R'''OA in which R''' is a divalent hydrocarbon radical having 1 to 18 carbon atoms, or the corresponding oxyalkylene radical, and A is the radical $$CH_2=C(B)C=O$$

in which B is selected from hydrogen or the methyl radical.

15. The composition of claim 13, wherein said Z group is represented by the formula $$-R'(NC_2H_4)_kN(CH_2CH(CH_2)_mOA)_2$$
$$\phantom{-R'(NC_2H_4)_kN(}H \phantom{CH_2CH(}OH$$

in which R' is a divalent hydrocarbon group, m is an integer between 1 and 10, k is 0, 1, 2, 3, or 4, A is the group $$CH_2=C(B)C=O$$

and B is selected from hydrogen or the methyl radical.

16. The composition of claim 13, wherein said Z group is selected from groups represented by the formulae —DNHG or —DNGDNHG in which D is a divalent saturated hydrocarbon radical having from 1 to 6 carbon atoms and G is the group $$-CONH(C_{m'}H_{2m'})OCOC=CH_2$$
$$\phantom{-CONH(C_{m'}H_{2m'})OCOC=}B$$

where B is selected from hydrogen or the methyl radical and m' is 2, 3 or 4.

17. The composition of claim 13, wherein said Z group is represented by the formula

—QNAQ'NAR'''' in which Q and Q' denote divalent hydrocarbon radicals, R'''' is hydrogen or a monovalent hydrocarbon radical, A is the group $$CH_2=C(B)C=O$$

and B is selected from hydrogen or the methyl radical.

18. The composition of claim 13, wherein said Z group is represented by the formula $$R''''OCH_2CHCH_2OA$$
$$\phantom{R''''OCH_2CH}OA$$

in which R'''' is a divalent hydrocarbon group having 3 to 6 carbon atoms, A is the group $$CH_2=C(B)C=O$$

and B is selected from hydrogen or the methyl radical.

19. The composition of claim 18, wherein said R'''' group is trimethylene, said R group is methyl and said R' group is isobutylene.

20. The composition of claim 17, wherein said Q group is —CH$_2$CH(CH$_3$)CH$_2$—, said Q' group is —CH$_2$CH$_2$—, said R'''' group is hydrogen, said R group is methyl and said R' group is isobutylene.

21. A process for preparing a cured organopolysiloxane material, comprising: reacting (i) an amine-functional organopolysiloxane consisting of a plurality of independently selected units of the formula $$R_aSiO_{(4-a-b)/2}$$
$$\phantom{R_aSiO_{(4-a-}}X_b$$

wherein X is an amine-functional organic group bearing at least one —NHR" group, in which R" is hydrogen or an alkyl radical having 1–6 carbon atoms, R is a group selected from alkyl, cycloalkyl, haloalkyl or aromatic radicals, a has a value of 0, 1, 2, or 3, b has a value of 0, 1 or 2, and the sum (a+b) is less than 4, there being on average at least two X groups per molecule of said amine-functional organopolysiloxane with (ii) an acryl-functional organopolysiloxane consisting of a plurality of independently selected units of the formula $$R_cSiO_{(4-c-d)/2}$$
$$\phantom{R_cSiO_{(4-c-}}Z_d$$

wherein Z is an acryl-functional organic group bearing at least one group selected from acryloxy, methacryloxy or acrylamide radicals, R has been previously defined, c has a value of 0, 1, 2, or 3, d has a value of 0, 1 or 2, and the sum (c+d) is less than 4, there being on average at least two Z groups per molecule of said acryl-functional organopolysiloxane, and at least one of (i) and (ii) has an average of more than two of said X groups and said Z groups, respectively, per molecule.

22. The process according to claim 21, wherein said R groups of components (i) and (ii) are independently selected from methyl, phenyl or 3,3,3-trifluoropropyl radicals.

23. The process according to claim 22, wherein said X group is represented by the formula —R'(NHCH$_2$CH$_2$)$_g$NR"H in which R' is a divalent hydrocarbyl group having 3 to 6 carbon atoms, R" is selected from hydrogen or an alkyl radical having 1 to 6 carbon atoms and g is an integer having a value of zero to 4.

24. The process according to claim 23, wherein said Z group is represented by the formula

—QNAQ'NAR'''' in which Q and Q' denote divalent hydrocarbon radicals, R'''' is hydrogen or a monovalent hydrocarbon radical, A is the group

CH$_2$=C(B)C=O
| and B is selected from hydrogen or the methyl radical.

25. The process according to claim 23, wherein said Z group is represented by the formula

R'''''OCH$_2$CHCH$_2$OA
|
OA in which R''''' is a divalent hydrocarbon group having 3 to 6 carbon atoms, A is the group

CH$_2$=C(B)C=O
| and B is selected from hydrogen or the methyl radical.

26. The process according to claim 25, wherein said R''''' group is trimethylene and said R group is methyl.

27. The process according to claim 24, wherein said Q group is —CH$_2$CH(CH$_3$)CH$_2$—, said Q' group is —CH$_2$CH$_2$—, said R'''' group is hydrogen and said R group is methyl.

28. The process according to claim 21, wherein said organopolysiloxane (i) is selected from linear copolymers having the average structure R$_3$SiO(R$_2$SiO)$_x$(RSiO)$_y$SiR$_3$ or R$_2$SiO(R$_2$SiO)$_x$SiR$_2$
|                  |             |
X                   X             X in which the average value of x can vary from zero to about 1000 and the average value of y can vary from 2 to about 100; and said organopolysiloxane (ii) is selected from linear copolymers having the average structure R$_3$SiO(R$_2$SiO)$_{x'}$(RSiO)$_{y'}$SiR$_3$ or R$_2$SiO(R$_2$SiO)$_{x'}$SiR$_2$
|                  |             |
Z                   Z             Z in which the average value of x' can vary from about 5 to about 500 and the average value of y' can vary from 2 to about 30.

29. The process according to claim 28, wherein said R groups of components (i) and (ii) are independently selected from methyl, phenyl or 3,3,3-trifluoropropyl radicals.

30. The process according to claim 29, wherein said X group is represented by the formula —R'(NHCH$_2$CH$_2$)$_g$NR''H in which R' is a divalent hydrocarbyl group having 3 to 6 carbon atoms, R'' is selected from hydrogen or an alkyl radical having 1 to 6 carbon atoms and g is an integer having a value of zero to 4.

31. The process according to claim 30, wherein said Z group is represented by the formula

—QNAQ'NAR'''' in which Q and Q' denote divalent hydrocarbon radicals, R'''' is hydrogen or a monovalent hydrocarbon radical, A is the group

CH$_2$=C(B)C=O
| and B is selected from hydrogen or the methyl radical.

32. The process according to claim 30, wherein said Z group is represented by the formula

R'''''OCH$_2$CHCH$_2$OA
|
OA in which R''''' is a divalent hydrocarbon group having 3 to 6 carbon atoms, A is the group

CH2=C(B)C=O
| and B is selected from hydrogen or the methyl radical.

33. The process according to claim 32, wherein said Q group is —CH$_2$CH(CH$_3$)CH$_2$—, said Q' group is —CH$_2$CH$_2$—, said R'''' group is hydrogen, said R group is methyl and said R' group is isobutylene.

34. The process according to claim 31, wherein said R''''' group is trimethylene, said R group is methyl and said R' group is isobutylene.

35. The composition of claim 1, further comprising an inhibiting amount of a volatile acid.

36. The composition of claim 11, further comprising an inhibiting amount of a volatile acid.

37. The composition of claim 17, further comprising an inhibiting amount of a volatile acid.

38. The composition of claim 18, further comprising an inhibiting amount of a volatile acid.

39. A cured organopolysiloxane reaction product of the composition defined by claim 1.

40. A cured organopolysiloxane reaction product of the composition defined by claim 2.

41. A cured organopolysiloxane reaction product of the composition defined by claim 3.

42. A cured organopolysiloxane reaction product of the composition defined by claim 7.

43. A cured organopolysiloxane reaction product of the composition defined by claim 8.

44. A cured organopolysiloxane reaction product of the composition defined by claim 11.

45. A cured organopolysiloxane reaction product of the composition defined by claim 12.

46. A cured organopolysiloxane reaction product of the composition defined by claim 13.

47. A cured organopolysiloxane reaction product of the composition defined by claim 17.

48. A cured organopolysiloxane reaction product of the composition defined by claim 18.

* * * * *

UNITED STATES PATENT AND TRADEMARK OFFICE
CERTIFICATE OF CORRECTION

PATENT NO. : 4,698,406
DATED : October 6, 1987
INVENTOR(S) : Peter Y.K. Lo et al It is certified that error appears in the above-identified patent and that said Letters Patent is hereby corrected as shown below:

On the title page inventors should read

--(75) Inventors: Peter Y.K. Lo; Maris J. Ziemelis; Padmakumari J. Varaprath, all of Midland, Mich.--.

Signed and Sealed this

Twelfth Day of April, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,698,406

DATED : October 6, 1987

INVENTOR(S) : Peter Y. K. Lo, Maris J. Ziemelis

It is certified that error appears in the above-identified patent and that said Letters Patent is hereby corrected as shown below:

In Abstract, line 3 - Revise "acyloxy-,"

to read --acryloxy-,--

Column 7, line 16 - Revise "polysocyanate"

to read --polyisocyanate--

Column 9, line 2 - Revise "Dioxolanc,"

to read --Dioxolane,--

Column 9, line 56 - Revise "$CF_3CH_2CF_2CF_2CH_2CH_2Me_2SiO_{1/2}$."

to read --$CF_3CF_2CF_2CF_2CH_2CH_2Me_2SiO_{1/2}$."

Column 10, line 3 - Revise "Preferably red, components"

to read --Preferably, components--

Column 12, line 3 - Revise "abovedescribed"

to read --above-described--

Column 12, line 55 - Revise "RTV scalants"

to read --RTV sealants--

UNITED STATES PATENT AND TRADEMARK OFFICE
CERTIFICATE OF CORRECTION

PATENT NO.   : 4,698,406

DATED        : October 6, 1987

INVENTOR(S)  : Peter Y. K. Lo, Maris J. Ziemelis

It is certified that error appears in the above-identified patent and that said Letters Patent is hereby corrected as shown below:

Column 13, line 13 - Revise "allyloxy-1,-2-"

to read --allyloxy-1,2- --

Column 14, line 12 - Revise "4.0% +/- /0.2%."

to read --4.0% +/-0.2%.--

Column 14, line 23 - Revise "volaties"

to read --volatiles--

Column 14, line 47 - Revise "hydroguinone"

to read --hydroquinone--

Column 16, line 39 - Revise "acctic"

to read --acetic--

Signed and Sealed this

Second Day of August, 1988

Attest:

DONALD J. QUIGG

*Attesting Officer*       *Commissioner of Patents and Trademarks*